(12) United States Patent
Lee

(10) Patent No.: US 6,285,798 B1
(45) Date of Patent: Sep. 4, 2001

(54) AUTOMATIC TONE ADJUSTMENT BY CONTRAST GAIN-CONTROL ON EDGES

(75) Inventor: Hsien-Che Lee, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/210,107

(22) Filed: Dec. 11, 1998

Related U.S. Application Data

(60) Provisional application No. 60/091,767, filed on Jul. 6, 1998.

(51) Int. Cl.$^7$ .............................. G06T 5/20; G06T 5/40; G06T 5/50
(52) U.S. Cl. ......................... 382/260; 382/263; 382/264; 382/266
(58) Field of Search ..................... 382/260, 261, 382/263, 264, 266, 254, 274, 232, 128, 132

(56) References Cited

U.S. PATENT DOCUMENTS

| | | | |
|---|---|---|---|
| 4,812,903 | 3/1989 | Wagensonner et al. | 358/521 |
| 5,012,333 | 4/1991 | Lee et al. | 358/520 |
| 5,454,044 | 9/1995 | Nakajima | 382/132 |
| 5,467,404 | 11/1995 | Vuylsteke et al. | 382/274 |
| 5,471,987 | 12/1995 | Nakazawa et al. | |
| 5,493,622 | 2/1996 | Tsuchino et al. | 382/132 |
| 5,608,813 | 3/1997 | Nakajima | 382/132 |
| 5,717,791 | 2/1998 | Labaere et al. | 382/274 |
| 5,774,599 | * 6/1998 | Muka et al. | 382/254 |
| 5,796,870 | 8/1998 | Takeo | 382/232 |
| 6,069,979 | * 5/2000 | VanMetter | 382/260 |

FOREIGN PATENT DOCUMENTS 849 940 A2 * 6/1998 (EP) ........................ H04N/5/20

OTHER PUBLICATIONS

Mallat and S. Zhong "Characterization of signals from multiscale edges," *IEEE Transactions on Pattern Analysis and Machine Intelligence*, 14, 7, 710–732, 1992.

J. Lu, D. M. Healy, Jr., and J. B. Weaver, "Contrast enhancement of Medical Images Using Multiscale Edge Representation," *Optical Engineering*, 33,7,2151–2161, 1994.

* cited by examiner

*Primary Examiner*—Scott Rogers
(74) *Attorney, Agent, or Firm*—Peyton C. Watkins

(57) ABSTRACT

A method of reducing the dynamic range of an input image for effectively rendering the input image on an output display medium, the method comprises the steps of extracting detail signals and coarse signals from the input image; generating contrast gain-control signals from the input image by detecting coarse scale edges; modifying the detail signals according to the contrast gain signals; and, adding the modified detail signals to the coarse signals to obtain an output image.

16 Claims, 12 Drawing Sheets

AUTOMATIC TONE ADJUSTMENT BY CONTRAST GAIN-CONTROL ON EDGES

CROSS REFERENCE TO RELATED APPLICATION

Reference is made to and priority claimed from U.S. Provisional Application Ser. No. 60/091,767, filed Jul. 6, 1998, entitled AUTOMATIC ADJUSTMENT BY CONTRAST GAIN-CONTROL ON EDGES.

FIELD OF THE INVENTION

This invention relates to an automatic tone adjustment method for computer processing of digital images which have a dynamic range larger than the intended output display media, such as photographic paper, monitor display, and transparent film.

BACKGROUND OF THE INVENTION

Many image capture devices can record a signal dynamic range that is wider than a typical display device can render effectively. For example, consumer color negative films can record scene luminance range of 1000:1, but photographic color papers can only render a luminance range from 50:1 to 100:1. Another example is the storage phosphor used in digital radiography, which can capture an x-ray exposure dynamic range of 10,000:1, but a radiographic film as an output medium can render only a small fraction of it (about 20:1) in good contrast. In both examples, wide dynamic range images will suffer very significant loss of details in the highlight and the shadow, when they are displayed on their intended output media. Several inventions have been disclosed for solving such problems.

The best known method is the unsharp masking and its variations. U.S. Pat. No. 5,012,333 and U.S. Pat. No. 4,812,903 teach methods of decomposing an input image into a low-frequency component and a high-frequency component. By modifying the low-frequency component with a nonlinear tone scale curve and amplifying the high-frequency component (unsharp masking), one can combine the two modified components back to form a new image which has a smaller dynamic range and yet retain most image details. U.S. Pat. No. 5,608,813 and U.S. Pat. No. 5,454,044 teach a similar method, but formulates it in spatial domain. The low-frequency (unsharp) component is obtained by averaging image values over a local window. The low-frequency component is then used in a monotonically decreasing function to determine how much gray value is to be added or substracted from the original image. In essence, the method used the unsharp version of the original image to mask off the dynamic range in the input signal. These three methods are mathematically similar to the well known unsharp masking technique in photography, and all of them suffer from the same drawback of creating dark and bright banding around high-contrast edges as the unsharp masking technique does. The cause of this artifact is illustrated in FIG. 1. The unsharp (low-frequency) component rounds off a sharp edge signal to produce a smoothed version. The difference signal (the high-frequency component) between the original image and the unsharp version thus contains an overshoot and an undershoot around a sharp edge. When the difference signal (the high-frequency) is added back to the dynamic-range compressed low-frequency component, the uncompressed or amplified overshoot and undershoot signals around a sharp edge will create a bright band and a dark band near the edge. This artifact is more visible near high contrast edges. This artifact is called the edge banding artifact. The edge banding artifact is a very objectionable artifact in consumer images and a potentially dangerous artifact in digital radiography. In order to deal with this banding problem, U.S. Pat. No. 5,467,404 teaches a method of decomposing an image into multiple resolutions and using a predetermined nonlinear amplitude compression function for the high frequency component in each resolution. If the high frequency amplitude is small, it is passed unchanged or even amplified. If the high frequency amplitude is large, then it is attenuated. The assumption is that whenever the signal amplitude gets large, regardless of its cause, one should reduce its amplitude so that the overshoot and the undershoot near a sharp edge can be properly suppressed. A major deficiency of the method is that the amplitude in the each resolution alone can not be used to adequately identify whether the large amplitude is caused by a high contrast edge or an image texture. Without making the distinction, fine details and textures of high amplitudes will also be suppressed, resulting loss in details. A second major deficiency is that a predetermined nonlinear amplitude compression can not adaptively adjust the right amount of compression needed for edges in each resolution of image details at different spatial locations. Since every input image has a different dynamic range and thus requires varying amount of dynamic range compression. The amount of compression has to be coupled with how the algorithm adjusts the amplitude compression for each high frequency component. This need was mentioned in U.S. Pat. No. 5,493,622, but it did not teach how to compute the necessary tone compression curve, nor did it teach how the tone compression curve should be used to deal with the edge banding artifacts.

A third deficiency is that the frequency decomposition as described in U.S. Pat. No. 5,467,404 has to sum up pixel wise (after interpolation to the required number of pixels) to the original image when no modification is performed on any of the signal amplitudes in the decomposition. This constraint limits the types of detailed signals that can be extracted from the decomposition.

Another related approach to the frequency decomposition and modification method is the wavelet transform and inverse transform. For example, J. Lu, D. M. Healy, Jr., and J. B. Weaver disclosed such a method in the paper "Contrast enhancement of medical images using multiscale edge representation," Optical Engineering, 33, 7, 2151–2161, 1994.

A similar invention was also disclosed in U.S. Pat. No. 5,717,791. In these two prior arts, the goal was to adjust local image contrast through a multi resolution analysis. Although the multiscale edge structure used by both prior arts is indeed flexible and its proper use allows one to alleviate the third deficiency mentioned above, both prior arts still suffer the first two major deficiencies pointed out earlier: there was no explicit interaction between edges from different spatial scales and no explicit method to compute how much contrast should be adjusted. Both problems are solved in this new invention. A contrast gain-control (CGC) module in this new invention derives gain factors from edges of all scales and apply them to control how much edge information to add back to the image information at each scale. A tone scale curve (TSC) module in this new invention explicitly maps the input dynamic range to the dynamic range of the output medium. The details of these will be explained shortly in the following sections.

A different idea to deal with the edge banding artifact is disclosed in U.S. Pat. No. 5,471,987 and U.S. Pat. No. 5,786,870, where the unsharp (low frequency) component is calculated from a weighted average of a predetermined mask. The weighting is chosen so that less weight is applied to a given peripheral pixel in the mask if its absolute difference from the center pixel is large. The weighting is also chosen so that less weight is applied to a peripheral pixel if it is located farther away from the center pixel. By such a differential weighting scheme, pixels across a high contrast edge are not averaged together and therefore, the unsharp component has relatively sharp high contrast edges. If the image detail (high frequency) component is calculated by subtracting the unsharp component from the original image signal, then the image detail (high frequency) component will not have the overshoots or undershoots near a high contrast edge. Therefore, there will be no edge banding artifacts when the unsharp component and the image detail component are combined. This method is fairly effective. However, there are two major drawbacks in such a method. The first drawback is that it is very slow, because the weighted averaging operation is not a regular convolution operation. The second drawback is that the method can only deal with high contrast edges that have a short transition distance. If a luminance transition occurs continously over some longer distance, the absolute difference between the center pixel and its neighboring pixels will not be large, and therefore the weighting will be relatively uniform over the transition. The unsharp component will then be a blurred version of the original image and the image detail component will contain overshoots and undershoots which, when added back or enhanced, will be visible in the output image.

SUMMARY OF THE INVENTION

The present invention is directed to overcoming one or more of the problems set forth above. Briefly summarized, according to one aspect of the present invention, the invention resides in a method of reducing the dynamic range of an input image for effectively rendering the input image on an output display medium, the method comprising the steps of (a) extracting detail signals and coarse signals from the input image; (b) generating contrast gain-control signals from the input image by detecting coarse scale edges; (c) modifying the detail signals according to the contrast gain signals; and, (d) adding the modified detail signals to the coarse signals to obtain an output image.

An object of this invention is to provide an effective means for compressing the dynamic range of an input image so that it can be properly rendered to an output display medium that has a narrower dynamic range, without the deficiencies of the prior arts as mentioned above.

Another object of this invention is to provide a means for automatically computing an image-dependent tone scale (gradation) curve for dynamic range compression. Still, another object of the invention is to provide a means for computing gain-control signals for suppressing the edge banding artifacts around high-contrast edges. Yet another object is to provide a general and flexible image decomposition that allows explicit extraction of important image details, such as edges, lines, and textures.

DETAILED DESCRIPTION OF THE INVENTION

Figure 1:
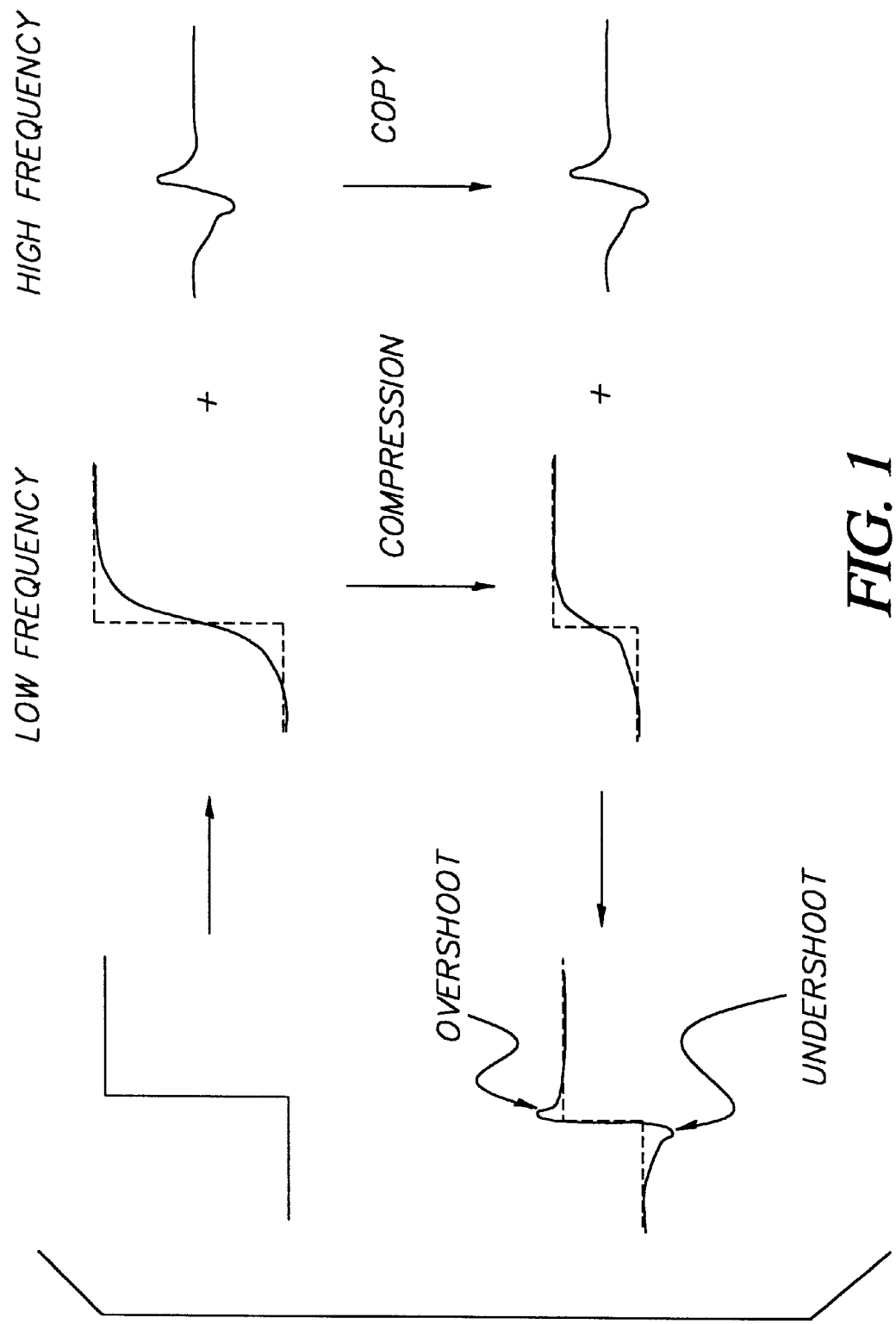
FIG. 1 shows how the banding artifact is generated by prior arts.

An overview of the invention is described with reference to FIG. 2 and FIG. 3. An input image, I, with wide dynamic range can be considered as having a component A which contains the global, large-scale dynamic range signal, and another component B which contains the local, fine scale image details. This can be written as I=A+B. The task is to compress the dynamic range of A by applying a compressive tone scale (T) to it. For purpose of enhancing the image details in B, an image enhancement operation E to B can be applied. Therefore the processed output image, I', can be written as I'=T(A)+E(B). Unsharp masking in the prior arts uses low-pass filtering or weighted local averaging to derive the A component from the input image, and compute B as B=I−A. In this invention, the separation of the A and B components from I is through a decomposition filter bank. These filters need not be linear. For example, since edges are important information in images, the decomposition can be accomplished through edge detectors at many spatial scales. On the top half of FIG. 2, the input image is past through the filter bank 10. On the lower half, the input image is input through a tone scale processor 40 where it is compressed before it is past through the decomposition filter bank 20. If the dynamic range of the input image is small, the tone scale curve will not reduce the dynamic range further and the output from the upper filter bank will be essentially the same as that from the lower filter bank. If the dynamic range of the image is large, then the output from these two filter banks will differ significantly, especially in the highlight and shadow regions where the tone scale curve will try to compress. The central question is to decide how to best combine the outputs from the two filter banks so that the reconstructed output image will have a narrower dynamic range to match the intended output medium, but also have all the useful image details properly rendered so that they are pleasingly visible. This invention discloses a contrast gain-control means 30 to produce the desired weighting factors, W and W', to combine the outputs from the two filter banks 10 and 20. The output from the decomposition filter bank 10 is always weighted more in the low-modulation areas in an image, i.e., W>>W'. In the areas where high contrast edges occur, the output from the decomposition filter bank 20 is weighted more (W'>>W), and the output image is reconstructed by a reconstruction filter bank 50. The reconstructed output image $I_{out}$ will take its high contrast edge signals from the dynamic range compressed image. The resulting images will have the fine low-contrast details as in the original input image and also have the much-reduced high contrast edges as in the dynamic range compressed image.

Figure 2:
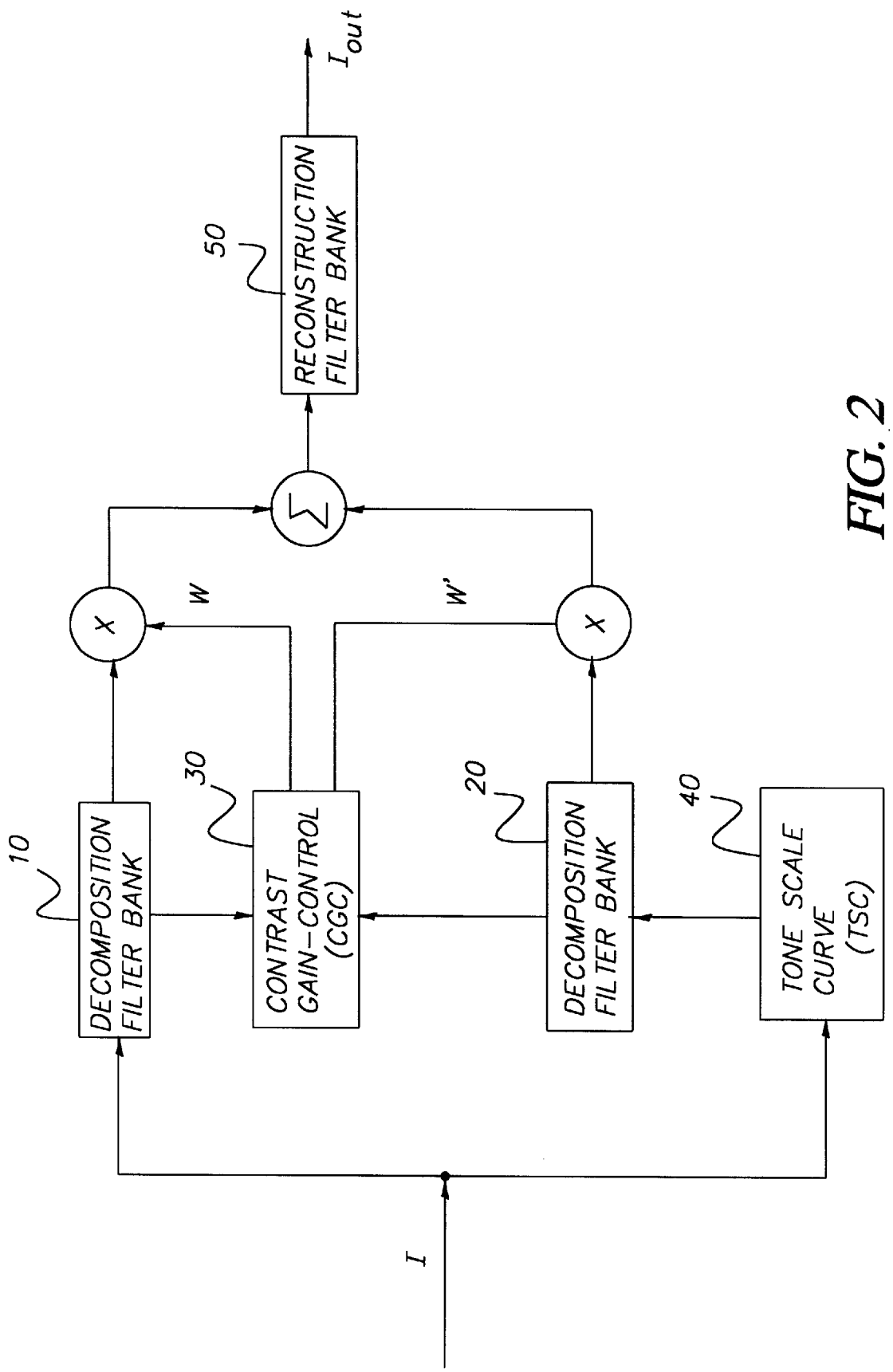
FIG. 2 shows one embodiment of this invention. The output image is reconstructed from the weighted average of the decomposition filter outputs from the original image and its tone scaled version.
Figure 3:
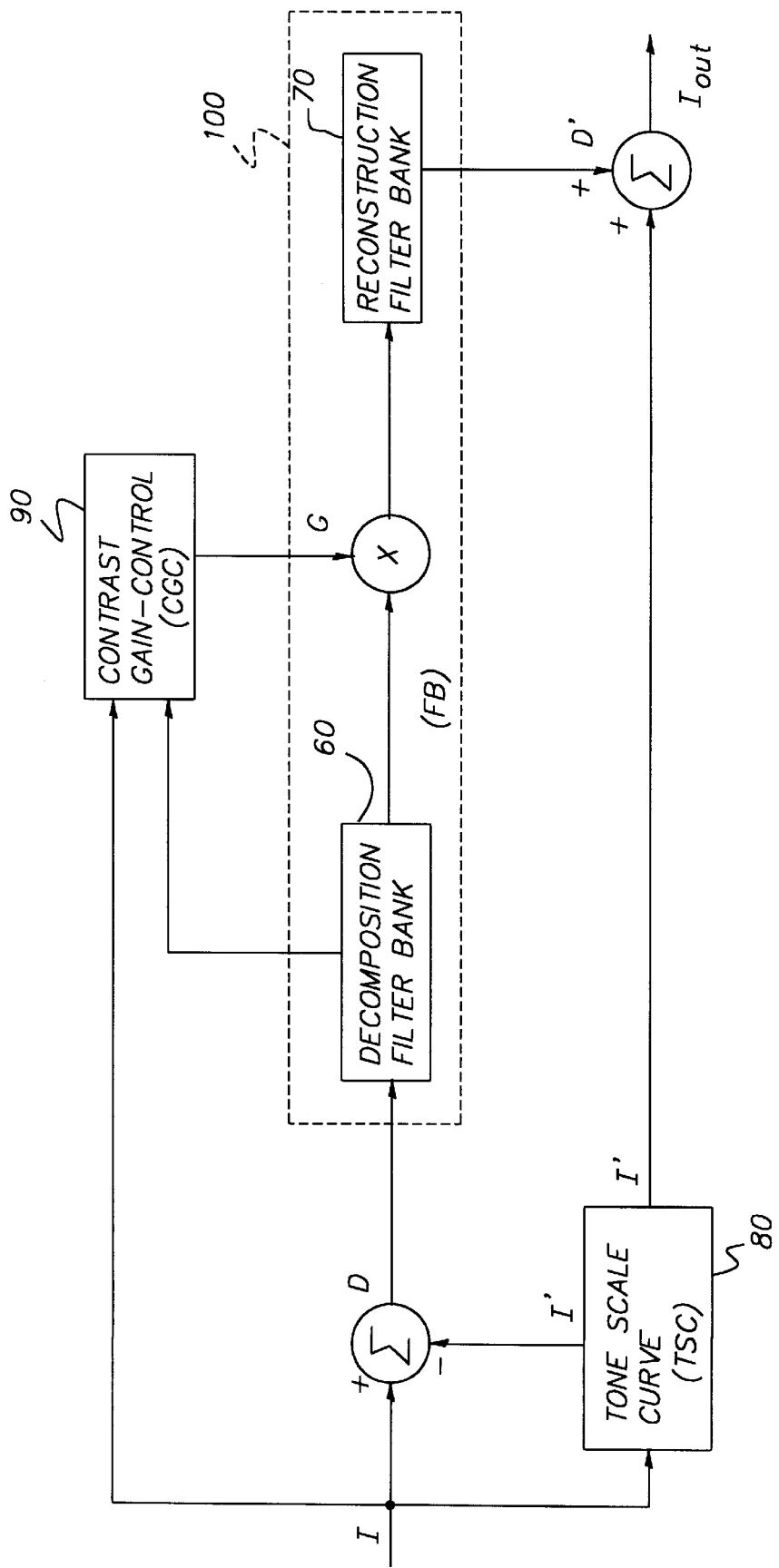
FIG. 3 is a block diagram of the preferred embodiment of this invention. It shows the three major modules that function together to produce a dynamic range compressed output image $I_{out}$.

The invention as expressed in FIG. 2 can be performed more efficiently by a different embodiment as shown in FIG. 3. Instead of processing the original version of the input image and its tone-scaled version through the decomposition filter bank separately, the new embodiment only processes the difference between the two versions. Therefore, the function of the decomposition filter bank 60 and the reconstruction filter bank 70 can be treated as extracting the desired image details or other features that might have been lost in the tone scale compression of the input image. This new perspective is quite important because the tone-scaled image is considered as the baseline output image that has the desired dynamic range and then the algorithm can choose freely what image details is desired to add back to that baseline output image. This means that the design of the decomposition and the reconstruction filter banks 60 and 70 has to satisfy fewer constraints than a perfectly analysis-synthesis filter pair has to. The present invention will focus on the framework laid out in FIG. 3, with the understanding that FIG. 2 is an alternative embodiment using most of the same ideas about the tone scale curve design and the contrast gain-control with between-scale interactions.

Still referring to FIG. 3, this invention consists of three major modules: (1) tone scale curve (TSC) module 80, (2) contrast gain-control (CGC) module 90, and (3) filter banks (FB) module 100. The function of the TSC module 80 is to generate a tone scale curve that will map the dynamic range of the input image into the dynamic range of the output display media. The CGC module 90 is to generate the banding artifact suppression signal to modulate the edge signals extracted in the filter banks (FB) module 100.

An input image I is processed through the (TSC) module 80, which computes a tone scale curve for the input image and maps it through the curve to produce a tone-scaled (dynamic range compressed) image I'. The tone-scaled image I' is then subtracted from the input image I to produce a difference image D. The difference image D is processed through the filter bank 60, which extracts the edge and detail signals from the difference image D. The edge signals are modulated by the contrast gain-control signals from the (CGC) module 90 that uses edge signals from all scales to generate contrast gain-control signals. The output D' from the filter bank 70 therefore contains edges and details in the difference image D, with the edge banding artifacts suppressed by the contrast gain-control signals. D' is then added to the tone-scaled image I' to produce the output image, $I_{out}$.

Figure 4:
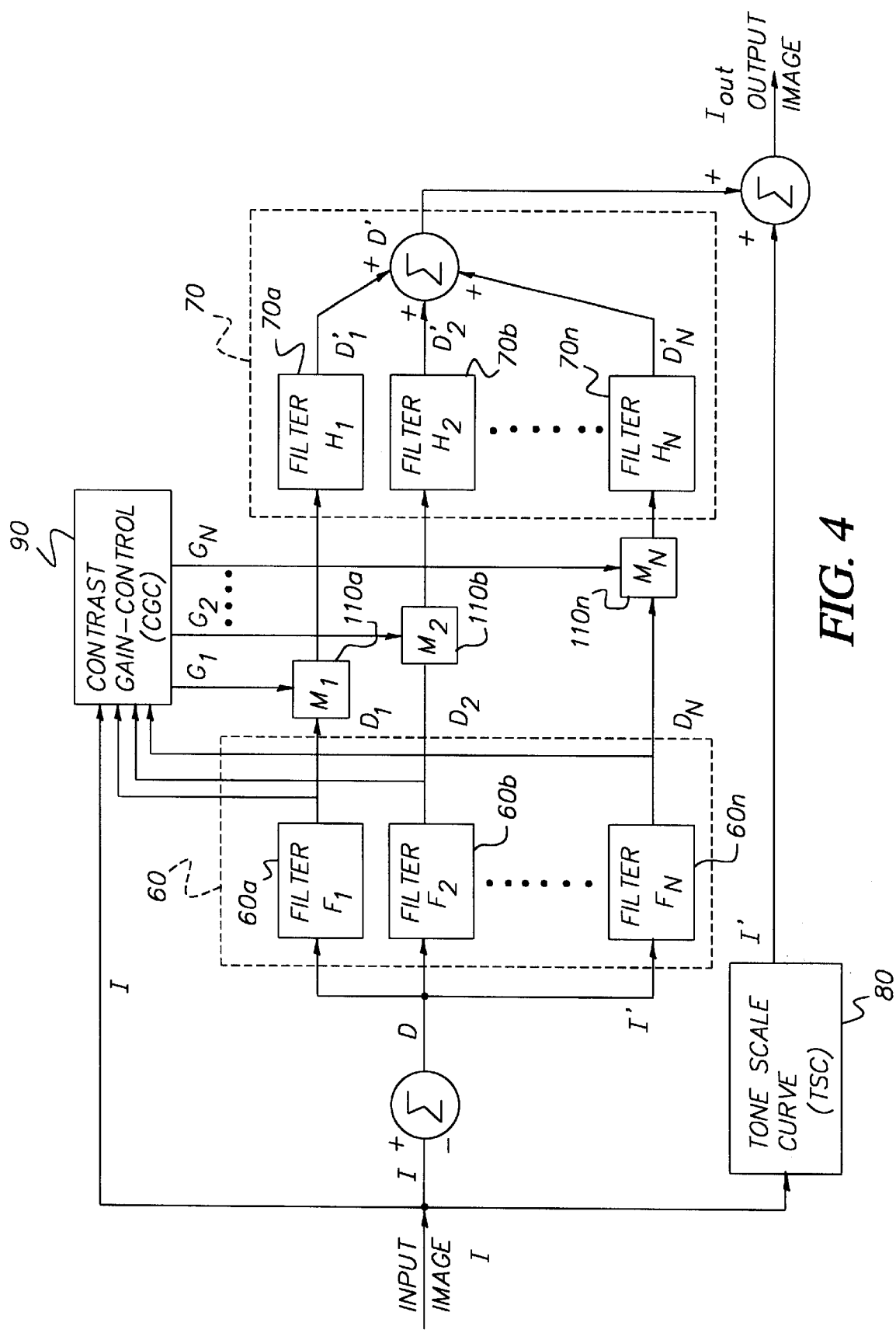
FIG. 4 is an expansion of FIG. 3 with more details of the filter banks module.

The block diagram of the invention in FIG. 3 is expanded further in FIG. 4, which shows the detailed structure of the filter banks module 100 (see FIG. 3) and how the gain-control signals are used to modulate the filter bank signal processing. The overall image processing steps are described and then they are followed by the detailed description of each of the three main modules.

First, an input image is processed in the tone scale curve (TSC) module 80. The dynamic range of an input image, 1, is determined from its histogram. A tone scale curve is then constructed to compress the dynamic range of the input image to that of the intended output display media. The input image is then mapped through the tone scale curve to produce a toned-scaled image, I'. The difference image D between I and I' (i.e., D=I–I') is then passed through a filter bank 60, consisting a set of N decomposition filters, $F_1$, $F_2$, . . . , and $F_N$ 60a, 60b, . . . 60n. These filters are feature extractors and they can be either linear or nonlinear. Their main function is to extract the image features, such as edges, textures, and shadings, that are considered as desirable targets for enhancement or suppression in a given application. The output $D_1$ through $D_N$ from each of the filters is modulated in Modulator $M_1$ through $M_N$ (110a through 110n) by a gain-control signal which is produced by the contrast gain-control generator 90 from the input image, I and all the outputs from the decomposition filter bank 60. Each of these gain-adjusted signals, $D_1'$ through $D_N'$ is then passed through a reconstruction filter bank 70 consisting of a set of filters $H_1$, $H_2$, through $H_N$ (70a through 70n). The outputs from the reconstruction filter bank 70 are then summed together to produce a new difference signal, D', which is then added back to the tone-scaled image, I', to produce the desired output image, $I_{out}$=I'+D'.

Images can be captured and digitized by various imaging devices. It is important to calibrate the digitized image to the desired metric. In the following description of this invention, all images are calibrated to relative log scene exposures (RLSE), meaning that the log scene exposure has been shifted so that when it is printed digitally, the brightness of the image looks pleasing. For convenience, the relative log scene exposure is scaled up by a factor of 1000 so that one can use only integer values to represent the input and the output images. However, the intermediate results from the various filters are represented as floating point numbers, so that proper precision is always retained.

Having described how the overall system works, each module will now be described in detail.

Figure 5:
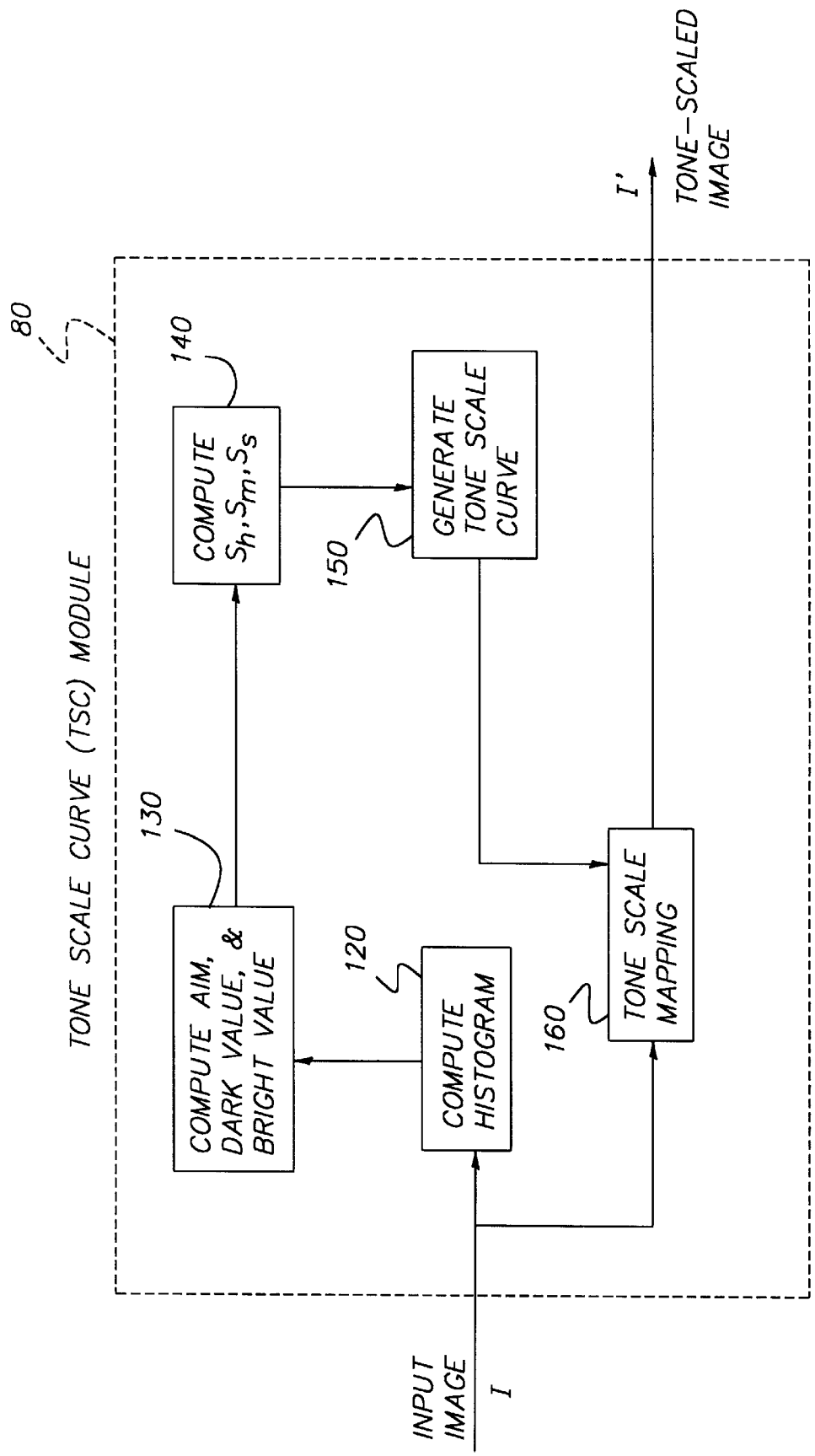
FIG. 5 is a block diagram of the tone scale curve (TSC) module.

The Tone Scale Curve (TSC) Module:

FIG. 5 shows a diagram of the Tone Scale Curve (TSC) Module 80. This module 80 computes a unique tone scale curve for each input image and applies it to produce a tone-scaled version of the input image. The major function of the tone scale curve is to compress the large dynamic range of the input image into a smaller dynamic range so that the output medium can render the image effectively.

The Tone Scale Module 80 uses a histogram accumulator 120 to compute the image histogram from the input image. From the histogram, the module 130 computes the aim, the dark value and the bright value of the input image. The highlight slope, $S_h$, the mid-tone slope $S_m$, and the shadow slope $S_s$ are then computed in block 140. From these computed parameters, a tone scale curve is generated in block 150. The tone scale curve is implemented as a lookup table in 160. The input image is mapped through the lookup table 160 to generate the tone-scaled image I'.

Figure 6:
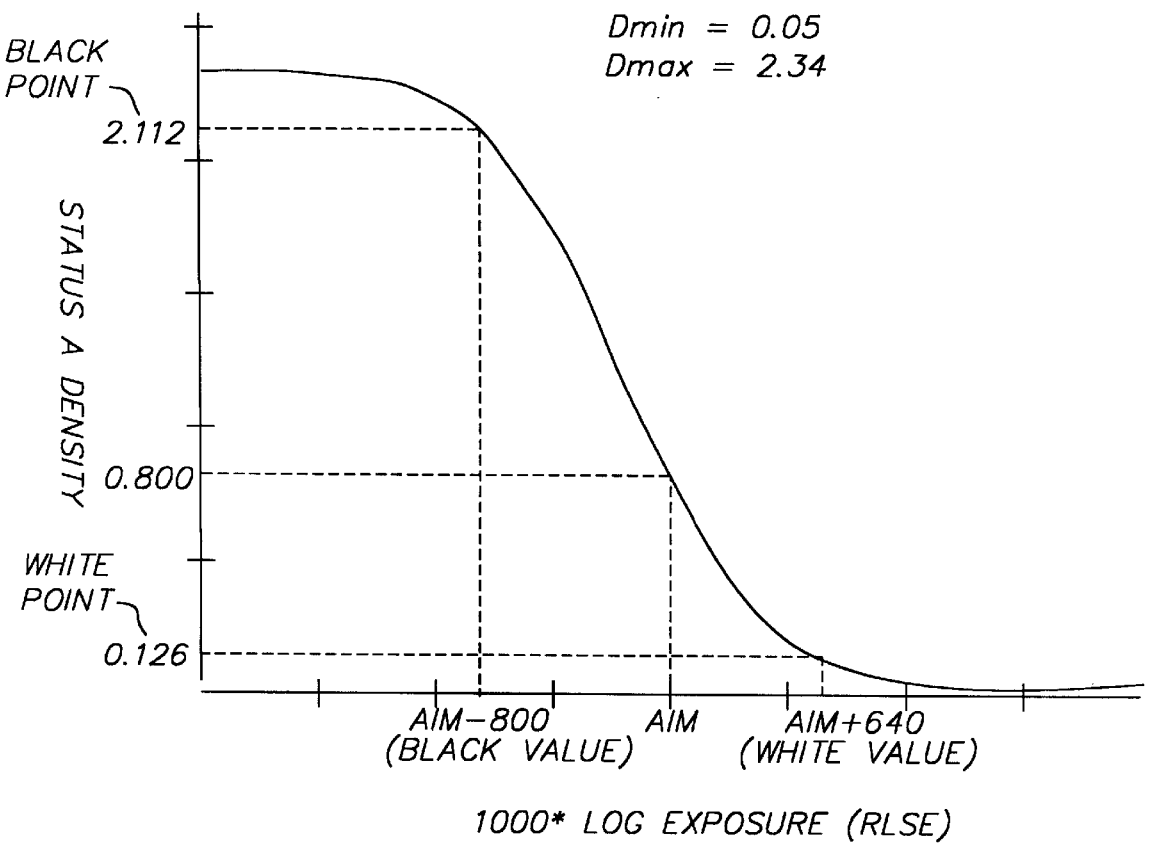
FIG. 6 shows the characteristic curve of an example photographic color paper. The diagram also shows the black point, the white point, the black value, and the white value.
Figure 7:
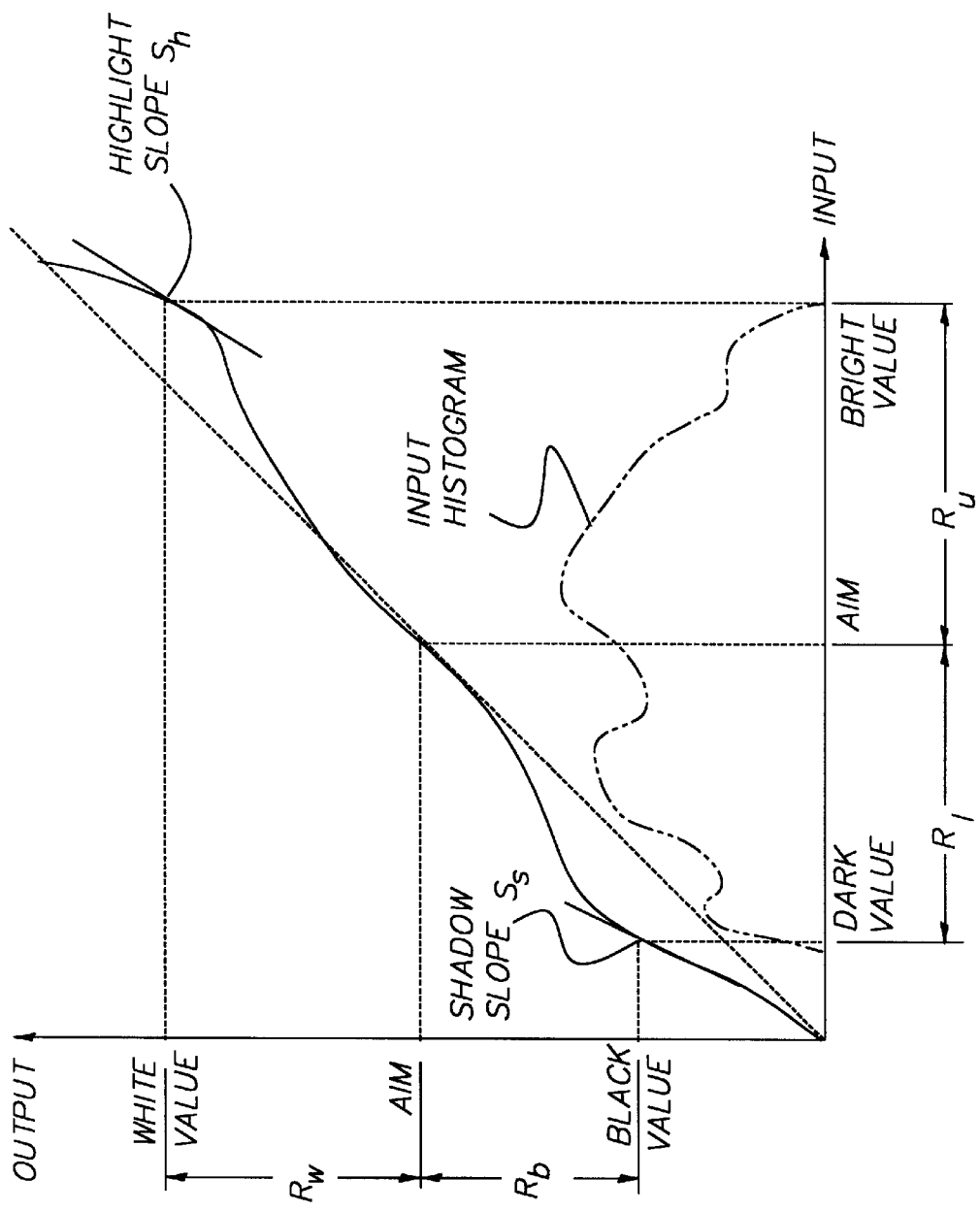
FIG. 7 shows the parameters used in the tone scale curve construction.

In order to adjust the dynamic range of the input image so that it can be effectively rendered to the intended output medium, the dynamic range of the output medium is needed. This information is available once an output medium is selected. For example, if the output medium is photographic paper, one can look up the minimum density ($D_{min}$) and the maximum density ($D_{max}$) of the paper and its dynamic range is approximately $D_{max}$–$D_{min}$. To account for viewing flare and to allow some rooms for signal modulation in the bright highlight and deep shadow, a slightly reduced dynamic range than $D_{max}-D_{min}$ is considered. For example, FIG. 6 shows a characteristic curve for a photographic paper. The x-axis is the log scene exposure and the y-axis is the resulting status A density after the paper is processed and developed. In digital printing, the printer can be calibrated to produce a photographic print according to such a characteristic curve. The minimum density of the paper is 0.05 and the maximum density is 2.34. As mentioned before, in order to allow for signal modulation, a density of 0.126 is selected as the white point on the paper and 2.112 as the black point, resulting in a slightly reduced dynamic range of 1.986=2.112−0.126. Because an image can be printed either lighter or darker by shifting the log exposure on the x-axis to the right or to the left, a density balance point needs to be specified where the middle gray in the image shall be printed in order to get a pleasing brightness rendition. This density balance point is referred to as the aim point of the image. The aim point is to be printed to a paper density 0.8. The black point and the white point on the y-axis of the paper curve in FIG. 6 are mapped to the black value and the white value on the x-axis, that represents the relative log scene exposure. The resulting black value and white value are (aim−800) and (aim+640). For an input image, a density balance value, i.e. the aim, has to be determined by a density balance algorithm, which is typically provided in almost all photofinishing printers. Once this aim value is chosen, the available dynamic range for the output image is restricted to the range from (aim−800) to (aim+640). Therefore, as shown in FIG. 7, the available paper dynamic range has to be split into the white range $R_w$ (aim to aim+640) and the black range $R_b$ (aim to aim−800). These two ranges are defined relative to a given display medium and they are fixed once an output medium is selected. If the input image has pixel values that exceed this range, it is the job of the tone scale curve to compress them into this range by adjusting the slopes in the various portions of the curve. The following describes how the tone scale curve is constructed to accomplish this dynamic range compression task.

First, the TSC module 80 computes the histogram of an input image. The upper 99.5 percentile code value of the input histogram is tentatively designated as the bright value of the image, and the 0.5 percentile code value, the dark value of the image (see FIG. 7). The upper range $R_u$ of an image is defined to be from the aim of the image to the bright value of the image. The lower range $R_l$ of an image is from the aim of the image to the dark value of the image. These two ranges, $R_u$ and $R_l$, vary from image to image, while the other two ranges, $R_w$ and $R_b$, are fixed once an output medium is chosen. Therefore, the job of the tone scale curve is to map $R_u$ into $R_w$, and $R_l$ into $R_b$. There are infinitely many tone scale curves that can be constructed to do this mapping. However, the following method of construction is the preferred embodiment for this invention.

Referring to FIGS. 6 and 7, the tone scale is constructed to satisfy six constraints: (1) the dark value is mapped to the black value; (2) the slope at the dark value is specified by the shadow slope $S_s$; (3) the aim value of the input image is mapped to itself; (4) the slope at the aim value is specified by the mid-one slope $S_m$; (5) the bright value is mapped to the white value; and, (6) the slope at the bright value is specified by the highlight slope, $S_h$.

Mathematically, this is a problem of interpolation under the constraint that the curve has to pass through 3 given points at given slopes. Before scribing how such a curve can be constructed, how the points and slopes are determined from a given image is first specified. First, the lower range $R_l$ of the input image is compared with the black range, $R_b$, of the output medium. If $R_l$ is larger than $R_b$ (meaning tone compression is needed in the shadow), then the 0.5 percentile value of the histogram is taken as the dark value. Otherwise, the input value (aim−800) is taken as the dark value. The shadow slope $S_s$ at the dark value in either case is always set at a value larger than 1.0. The preferred shadow slope is 2.0. Next, the upper range $R_u$ of the input image is compared with the white range, $R_w$, of the output medium. If $R_u$ is larger than $R_w$ (meaning tone compression is needed in the highlight), then the 99.5 percentile value of the histogram is taken as the bright value, and the highlight slope $S_h$ is empirically set according to the following formula:

$$S_h = 1.0 + \frac{1}{2}\left(1 - \frac{R_w}{R_u}\right). \tag{1}$$

If $R_u$ is equal to or smaller than $R_w$, then the input value (aim+640) is taken as the bright value and the highlight slope $S_h$ is set to 1.0. If an algorithm is available for estimating the scene contrast of the input image, the mid-tone slope $S_m$ can be adjusted accordingly. If such an algorithm is not available, then the preferred value is $S_m=1.0$.

There are many curves that can pass through three given points (the dark value, the aim, and the bright value) at the specified slopes ($S_s$, $S_m$, and $S_h$). Additional constraints are needed to construct a unique curve. For tone scale purpose, the instantaneous slope at any point on the curve is required to be greater than a minimum value $S_{min}$ and smaller than a maximum value, $S_{max}$, as specified by the user. This is to ensure that excessive quantization due to too high or too low slopes will not occur. It is further required that the slope changes at the three given points have to be gentle and the effect of a specified slope decays with distance as a Gaussian function with a specified standard deviation.

The problem is formulated in a more general setting. Given $S_{min}$, $S_{max}$, n points, ($x_i$, $y_i$), i=1, 2, . . . , n, where $x_i<x_j$ and $y_i<y_j$, for all i<j, and n slopes, $S_{min} \leq S_i \leq S_{max}$, i=1, 2, . . . , n, a monotonic curve y=$f(x)$, is needed such that $y_i=f(x_i)$, $S_i=f'(x_i)$ for i=1, 2, . . . , n, and $S_{min} \leq f'(x) \leq S_{max}$ for all x. The problem is solvable only if $S_{min} (x_j-x_i) \leq (y_j-y_i) \leq S_{max}(x_j-x_i)$ for all j>i. This curve construction problem is solved in this invention by a procedure to compute $f'(x)$ first and then the curve y=$f(x)$ is constructed by integrating $f'(x)$. The integration is started from the aim point and completed in two directions, one going up stopping at the bright value, and the other going down stopping at the dark value. In the process of integration, if the local slope at any point is greater than $S_{max}$, it is set at $S_{max}$. If it is smaller than $S_{min}$, it is set at $S_{min}$.

Figure 8:
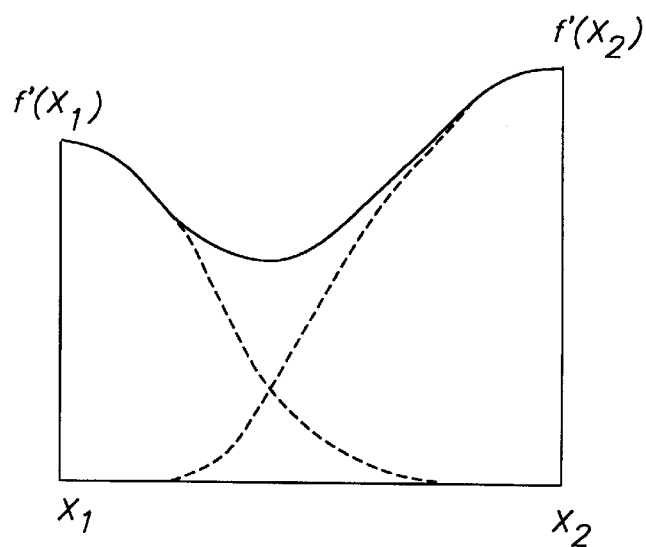
FIG. 8 shows how an interval of the slope curve is interpolated from the nodes.

To solve the above curve construction problem, two more constraints are imposed so that the solution can be efficiently derived: (1) each interval is interpolated independently, and (2) the interpolation function is a Gaussian function with a user-specified standard deviation (called width of influence). FIG. 8 shows how $f'(x)$, the first derivative of the tone scale curve, is constructed by Gaussian interpolation functions. Since each interval is interpolated independently, the interpolation process from $x_1$ to $x_2$ will be discussed without loss of generality. If it is assumed that the width of influence at $x_1$ and $X_2$ is $\sigma_1$ and $\sigma_2$, respectively. The interpolation function has the $$g(x) = A\exp\left[-\frac{(x-x_1)^2}{2\sigma_1^2}\right] + B\exp\left[-\frac{(x-x_2)^2}{2\sigma_2^2}\right] + C, \quad (2)$$

and the three unknown coefficients A, B, and C can be solved from the boundary conditions:

$$f'(x_1) = g(x_1) = A + B\exp\left[-\frac{(x_1-x_2)^2}{2\sigma_2^2}\right] + C$$

$$f'(x_2) = g(x_2) = A\exp\left[-\frac{(x_1-x_2)^2}{2\sigma_1^2}\right] + B + C$$

$$\int_{x_1}^{x_2} g(x) = f(x_2) - f(x_1) = y_2 - y_1.$$

The following quantities are defined as:

$$a = \exp\left[-\frac{(x_1-x_2)^2}{2\sigma_2^2}\right]$$

$$b = \exp\left[-\frac{(x_1-x_2)^2}{2\sigma_1^2}\right]$$

$$c = \int_{x_1}^{x_2} \exp\left[-\frac{(x-x_1)^2}{2\sigma_1^2}\right]dx$$

$$d = \int_{x_1}^{x_2} \exp\left[-\frac{(x-x_2)^2}{2\sigma_2^2}\right]dx$$

Then the solution for A, B, and C can be expressed as:

$$\begin{bmatrix}A\\B\\C\end{bmatrix} = \begin{bmatrix}1 & a & 1\\b & 1 & 1\\c & d & (x_2-x_1)\end{bmatrix}^{-1}\begin{bmatrix}f'(x_1)\\f'(x_2)\\(y_2-y_1)\end{bmatrix} \quad (3)$$

Figure 9:
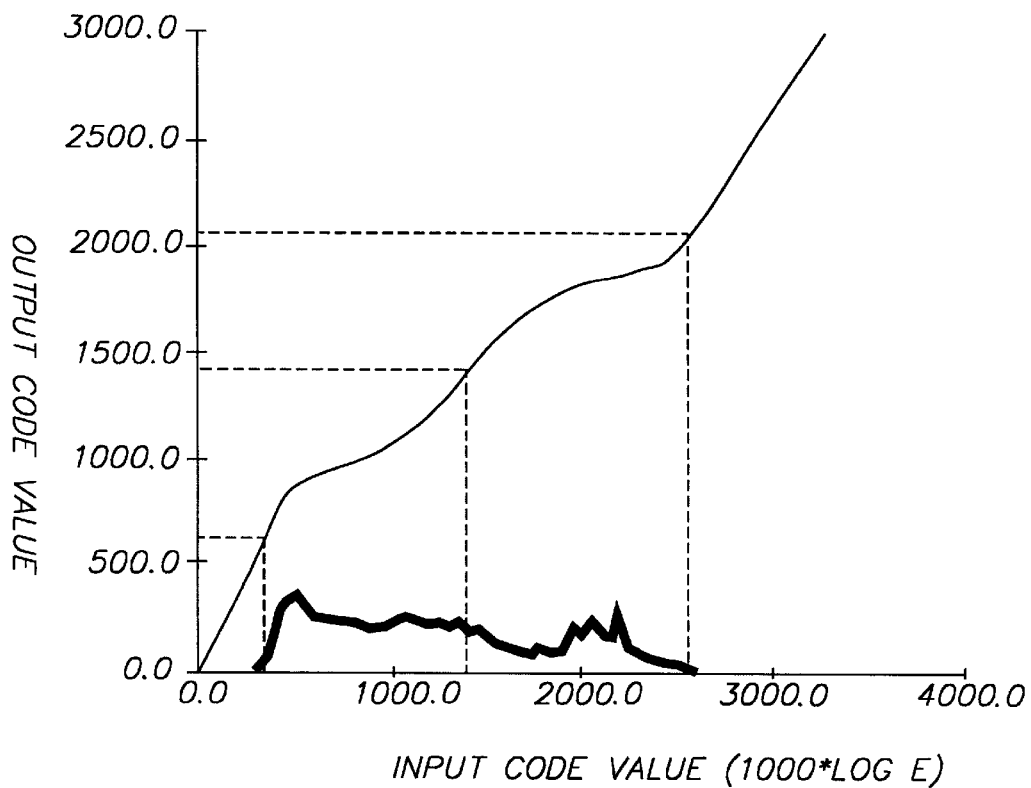
FIG. 9 shows an example of the histogram (the bottom curve) of an input image and the tone scale curve constructed from the histogram.

It is possible that the matrix can be singular and there exists no solution for the particular constraints. The algorithm then reduces $\sigma_1$ and $\sigma_2$ and tries to solve the equations again. This cycle will repeat several times until $\sigma_1$ and $\sigma_2$ become too small and the algorithm simply defaults to a constant slope solution for the interval. The preferred values of $\sigma$ at the three given points are $\sigma_1$=100.0 for the shadow, $\sigma_2$=300.0 for the mid-tone, and $\sigma_3$=80.0 for the highlight. FIG. 9 shows an example of the tone scale curve constructed by the method in this invention. The noisy curve at the bottom is the histogram of the input image.

The Contrast Gain-Control (CGC) Module

Figure 10:
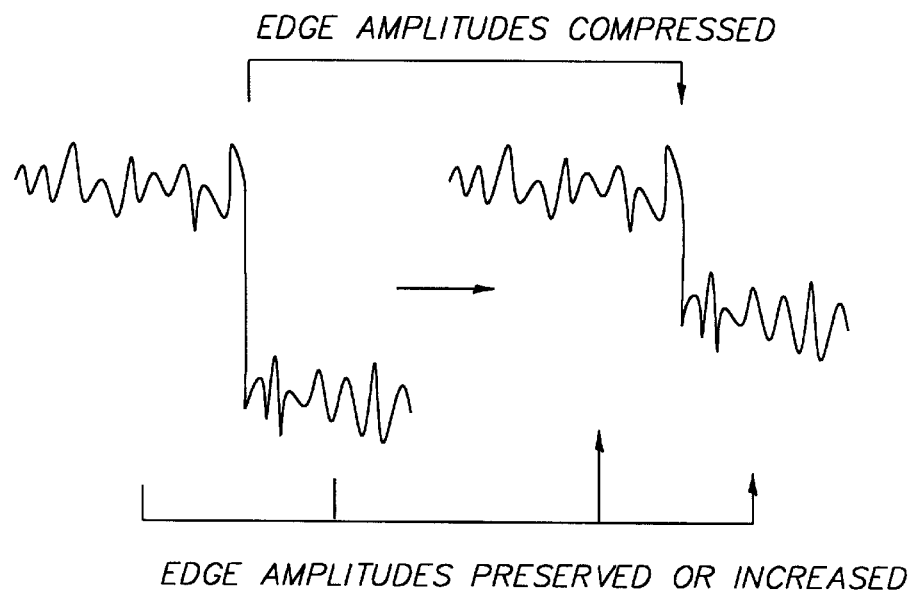
FIG. 10 shows the ideal way to compress an illumination edge, leaving all the reflectance edges alone.

A large dynamic range of a natural scene is almost always caused by illumination differences in various parts of the scene. The boundary between two different illuminations is called the illumination edge, which is often of high contrast and high exposure gradient. In comparison, the boundary between two different reflecting materials is called the reflectance edge, which is often of lower contrast and smaller exposure gradient. An ideal way to compress the dynamic range of an image is to reduce the magnitudes of the illumination edges, while preserving all reflectance edges. FIG. 10 illustrates how this ideal compression operation should be performed. An important step to achieving such selective edge magnitude compression is to identify where the illumination edges are in the image. Once the illumination edges are located, the magnitude of the edges can be controlled by adjusting the contrast gain-control applied to the illumination edges. The function of the Contrast Gain-Control (CGC) Module is to detect all the illumination edges in the input image and generate a gain-control signal for each pixel of the image. These gain-control signals are applied to the filter banks whose job is to extract edge signals of all magnitude. The small-magnitude reflectance edges are given a contrast gain of 1.0 or higher, while the large-amplitude illumination edges are given a very small gain. As a result of this gain control mechanism, the illumination edges are greatly suppressed in the output, D', of the filter banks (see FIG. 4). Ideally, D'=0 at pixels where illumination edges occur. Therefore, the illumination edges in the final output image, $I_{out}$, are mainly from the tone-scaled version of the input image, which is, of course, properly compressed in its dynamic range. Mathematically, $I_{out}$=I'+D'=I' for illumination edges. In comparison, the reflectance edges in the difference image D pass through the filter banks virtually unattenuated. Therefore, the output D' from the filter banks module contains almost the exact copy of the reflectance edges in I–I', and when it is added to I' to produce $I_{out}$, the reflectance edges are well preserved in the output image. Mathematically, $I_{out}$=I'+D'=I'+(I–I')=I for reflectance edges.

One important fact in image formation is that illumination edges are not easily distinguishable from reflectance edges at a small spatial scale because certain reflectance edges also have large edge magnitudes when edge magnitudes are computed from small spatial distances. A reliable detection of illumination edges has to be performed over large spatial distances. This is a very important point and it means that the contrast gain-control signal has to be computed from a coarse scale edge detection. Any scheme that attempts to suppress the banding artifacts has to use a coarse scale edge detector to control the contrast gain factors for edge filtering. This is why a gain-control function generated internally within each resolution can not work well. The gain-control signal for the fine resolution details has to come from the coarse resolution edges.

Figure 11:
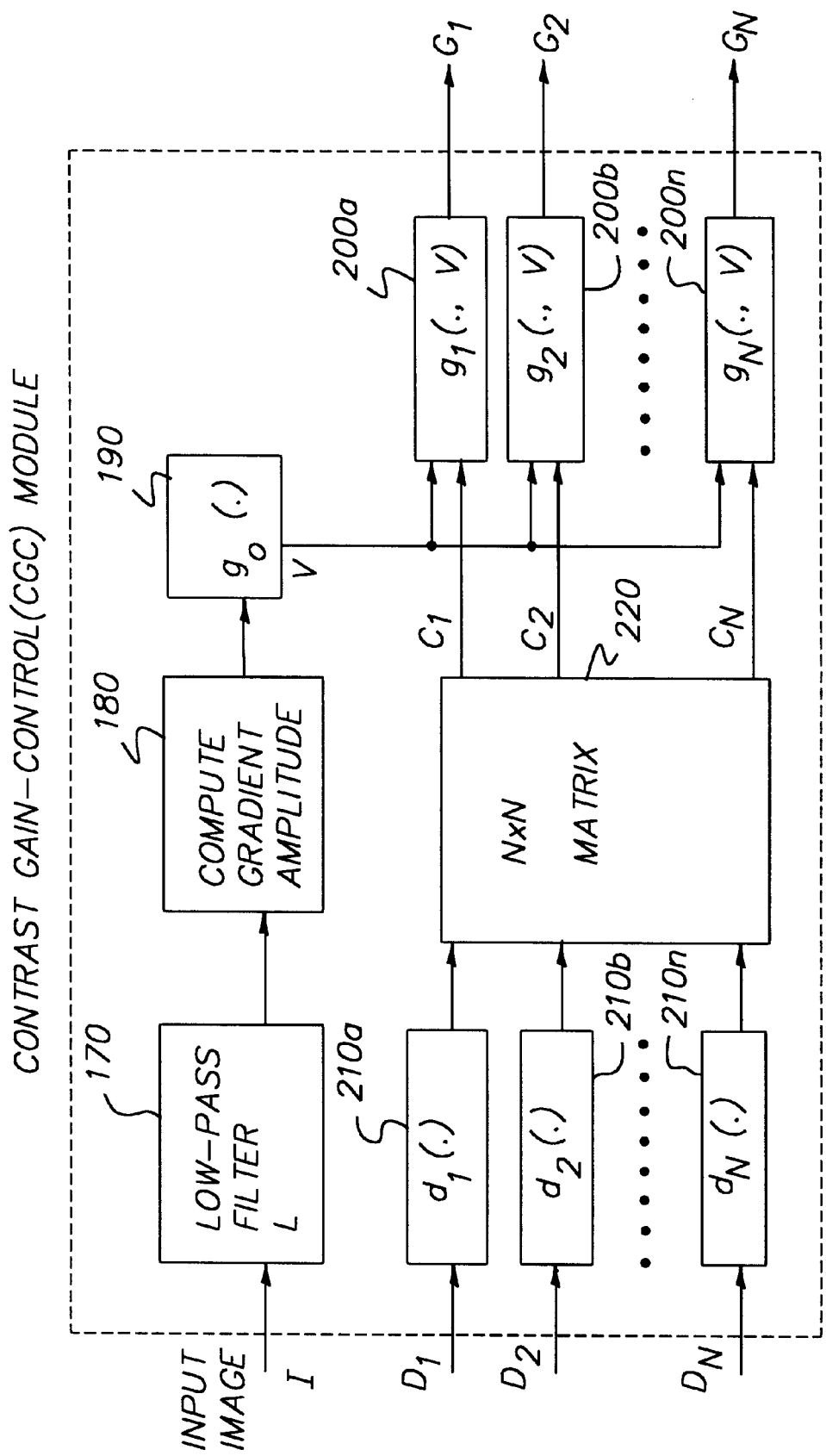
FIG. 11 shows the details of the contrast gain-control module.
Figure 12:
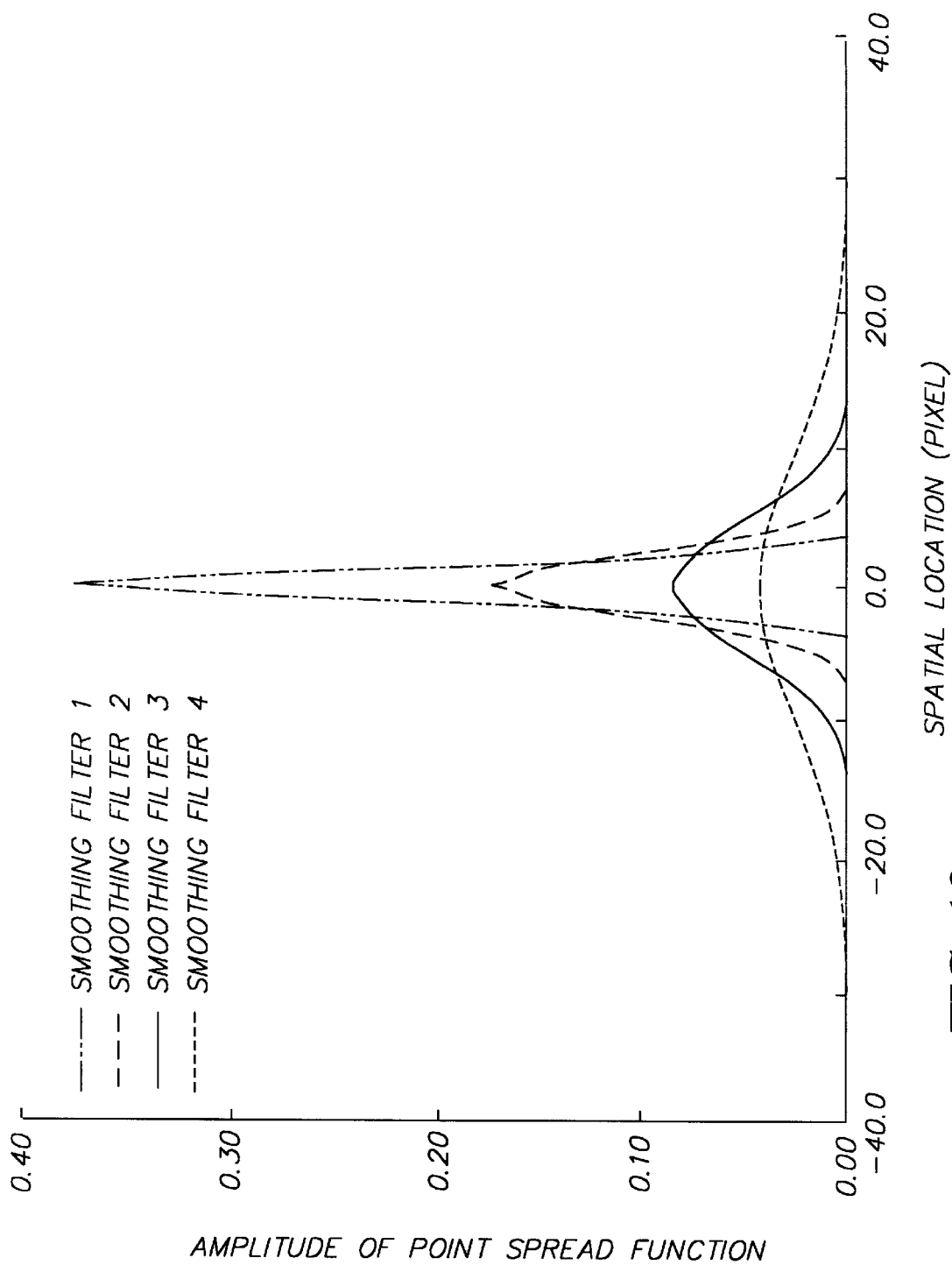
FIG. 12 shows the various low-pass (smoothing) L filters that are used on images of different sizes for computing the contrast gain-control signals.

FIG. 11 shows the preferred embodiment of the contrast gain-control signal generation. The input image is filtered through a low-pass (smoothing) filter to remove most of the fine reflectance edges. The low-pass filter (L) 170 in FIG. 11 is related to the filters of the coarsest resolution $F_N$ 60n in the filter banks (FB) 60 in FIG. 4. In the preferred embodiment, N=6, both $F_5$ and $F_6$ have the same coarse resolution. The common low-pass filter in $F_5$ and $F_6$ is $S(\omega_x)S(\omega_y)S(2\omega_x)S(2\omega_y)$ and the filter L should be chosen to have a comparable coarse resolution. A simple choice is to set $L(\omega_x, \omega_y)=S(\omega_x)S(\omega_y)S(2\omega_x)S(2\omega_y)$. The filters $F_5$, $F_6$, and S in the preferred embodiment will be described in detail shortly in the context of the filter banks module. FIG. 12 shows a series of smoothing filters that can be used for various image sizes. The filter is generated from a basic kernel of [1,4,6,4,1] with multiple convolutions with itself. In order to preserve the zero frequency response, the area under each smoothing filter is normalized to 1.0. For practical implementation of the invention, the exact shape of the smoothing filter is not important as long as it is smooth and compact. For example, a truncated Gaussian filter is also quite acceptable.

The algorithm then computes the edge gradient on the low-pass filtered image by the gradient amplitude processor 180. The edge gradient amplitude is computed by taking the square root of the sum of the square of horizontal pixel difference and the square of vertical pixel difference. The pixel difference is computed over a distance proportional to the size of the smoothing filter. The computed edge gradient amplitude is then mapped through a function $g_0$ 190 and the output, V, is used to modified the gain-control signals $G_1$, $G_2, \ldots, G_N$. The general functional form of $g_0$ is chosen so that when the edge gradient amplitude is small, its output value V is 1.0 and when the edge gradient amplitude is large, V, is zero. The V value is used as a mask image so that the functions $g_1, g_2, \ldots, g_N$ (200a, 200b ... 200n) can adjust its gain spatially. When the edge gradient amplitude is large, V is zero and the gain-control functions, $g_i$, will reduce the local gain factor $G_i$ to suppress the edge banding artifacts. The N additional input signals to the Contrast Gain-Control module are the output $D_1, D_2, \ldots, D_N$, from the decomposition filters $F_1, F_2, \ldots, F_N$. These calculate their energy. For example, a simple squaring function, $d_i(x)=x^2$, can be used. These N energy signals are then used to produce their weighted linear combinations via an N×N matrix 220. The N output signals, $C_1, C_2, \ldots, C_N$, from the matrix are further modified by functions $g_1, g_2, \ldots, g_N$, (200a, 200b ... 200n) under the influence of V, to produce the final gain-control signals $G_1, G_2, \ldots G_N$. The general form of the functions, $g_1, g_2, \ldots, g_n$, (200a, 200b ... 200n) is similar to that of $g_0$ (190). That is, gi produce gain factors close to 1.0 when $C_i$ is small. However, when $C_i$ is large, the output of $g_i$ depends on V. If V is close to 1.0, then $G_i$ is also close to 1.0. If V is close to zero, then $G_i$ is suppressed to be near zero as well.

The operation of the CGC module can be better understood from the following example. The illumination edges usually have large gradient amplitudes at a coarse spatial resolution as determined by the low-pass filter L in FIG. 11. The value V is then very small. As a consequence, all the gain-control signals, $G_1, G_2, \ldots G_N$, are also set at a very small value if $C_1, C_2, \ldots, C_N$ are large, and the illumination edge is suppressed. In comparison, reflectance edges are mostly smoothed out by the smoothing filter L (170) and only have small gradient amplitudes. Therefore, V will be close to 1.0. As a consequence, all the gain-control signals, $G_1, G_2, G_N$, are also set at a value close to 1.0, and the reflectance edges in $D_1, D_2, D_N$ of FIG. 4 are passed without any reduction in magnitude. It is worth pointing out again that this capability to discriminate between the illumination edges from the reflectance edges comes from the low-pass filter, L (170), as well as the amplitude mask produced by $g_0$ (190).

The Filter Banks (FB) Module

The Filter Banks (FB) Module (see FIG. 4) receives the difference image D=I−I', which represents the image details in the original image I that are lost in the dynamic range compressed image I'. These details include both the fine reflectance edges and the coarse illumination edges. The task of the filter banks is to extract the high frequency details, and to remove the very low frequency (DC) component that constitutes the major portion of the large dynamic range in the input image. But, not all the high frequency details should be allowed to pass through the filter banks. The part of high frequency signal that is associated with the illumination edges should be suppressed and the suppression is achieved by the gain-control signals from the CGC module.

The number of filter paths, N, is determined by the cost and system throughput constraints. As the number of filter paths increase, the banding artifact reduces, because more frequency channels allow the illumination edges to be suppressed more successfully as a function of spatial scales. Referring to FIG. 4, one of the unique feature of the filter banks in this invention is to separate each filter path into two parts, $F_i$ and $H_i$, with a nonlinear gain-control in between.

This design is desirable because the filter $F_i$ is designed to be edge (or texture) detectors in different spatial scales and orientations. Therefore the output from filter $F_i$ represents edge signals at a particular scale in a particular spatial orientation. It is this explicit edge contrast signal that is modulated by the contrast gain-control signal. Since the optimal decomposition by $F_i$ into edge representations does not necessarily lead to an optimal reconstruction by simple summation, a post processing filter, $H_i$, is required to reconstruct the difference image back. (Mathematically, $F_i$ filters are not orthogonal.) There are many possible choices for the decomposition-reconstruction filter pairs. The number of filter paths, N, and the image size will constrain the choices to a few for an efficient implementation. In the preferred embodiment, three frequency bands and two spatial orientations (vertical and horizontal) are selected, making the total number of paths equal to N=3×2=6. Let $\omega_x$ and $\omega_y$ be the spatial angular frequency in the x and y directions. The filters have the following frequency responses:

$$F_1(\omega_x, \omega_y) = R(\omega_x) \tag{4}$$

$$H_1(\omega_x, \omega_y) = Q(\omega_x)L(\omega_y) \tag{5}$$

$$F_2(\omega_x, \omega_y) = R(\omega_y) \tag{6}$$

$$H_2(\omega_x, \omega_y) = L(\omega_x)Q(\omega_y) \tag{7}$$

$$F_3(\omega_x, \omega_y) = S(\omega_x)S(\omega_y)R(2\omega_x) \tag{8}$$

$$H_3(\omega_x, \omega_y) = P(\omega_x)P(\omega_y)Q(2\omega_x)L(2\omega_y) \tag{9}$$

$$F_4(\omega_x, \omega_y) = S(\omega_x)S(\omega_y)R(\omega_y) \tag{10}$$

$$H_4(\omega_x, \omega_y) = P(\omega_x)P(\omega_y)L(2\omega_x)Q(2\omega_y) \tag{11}$$

$$F_5(\omega_x, \omega_y) = S(\omega_x)S(\omega_y)S(2\omega_x)S(2\omega_y)R(4\omega_x) \tag{12}$$

$$H_5(\omega_x, \omega_y) = P(\omega_x)P(\omega_y)P(2\omega_x)P(2\omega_y)Q(4\omega_x)L(4\omega_y) \tag{13}$$

$$F_6(\omega_x, \omega_y) = S(\omega_x)S(\omega_y)S(2\omega_x)S(2\omega_y)R(4\omega_x) \tag{14}$$

$$H_6(\omega_x, \omega_y) = P(\omega_x)P(\omega_y)P(2\omega_x)P(2\omega_y)L(4\omega_x)Q(4\omega_y) \tag{15}$$

where $$S(\omega) = \cos^4\left(\frac{\omega}{2}\right) \tag{16}$$

$$R(\omega) = i\sin\left(\frac{\omega}{2}\right)e^{i\omega/2} \tag{17}$$

Figure 13:
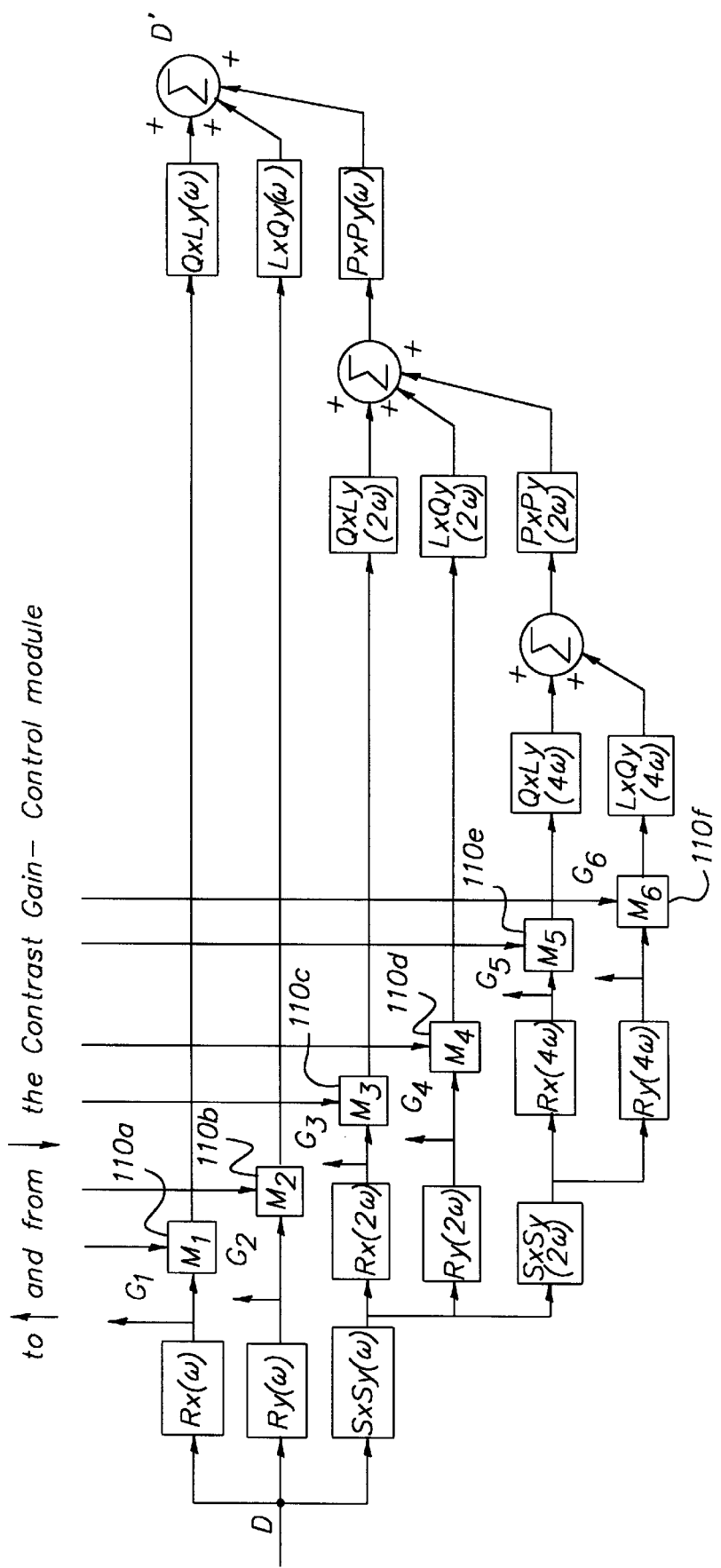
FIG. 13 shows the preferred embodiment of the filter banks (FB) module.

These filters are from the family of edge-wavelet filters that were used in Mallat and S. Zhong's paper, "Characterization of signals from multiscale edges," IEEE Transactions on Pattern Analysis and Machine Intelligence, 14, 7, 710–732, 1992. The filter banks can also be implemented in a different form as shown in FIG. 13, where the simplified notations have been used to make the figure more readable. For example, SxSy($\omega$) denotes $S(\omega_x)S(\omega_y)$, Rx(2$\omega$) denotes $R(2\omega_x)$, and so on. It should be pointed out that these filters are not the only choices. The preferred choice is that the $F_i$ filters should extract edge-like information.

From the definition of Fourier transform of a sampled function $f(n)$:

$$F(\omega) = \sum_{n=-\infty}^{\infty} f(n)e^{-i\omega n} \quad (21)$$

$$f(n) = \frac{1}{2\pi} \int_{-\pi}^{\pi} F(\omega)e^{i\omega n} d\omega, \quad (22)$$

the filter coefficients are derived as:

| N        | -4 | -3 | -2 | -1  | 0   | 1  | 2  | 3 | 4 |
|----------|----|----|----|-----|-----|----|----|---|---|
| 16 * s(n)| 0  | 0  | 1  | 4   | 6   | 4  | 1  | 0 | 0 |
| 2 * r(n) | 0  | 0  | 0  | 1   | -1  | 0  | 0  | 0 | 0 |
| 16 * p(n)| 0  | 0  | 1  | 4   | 6   | 4  | 1  | 0 | 0 |
| 128 * q(n)| 0 | -1 | -9 | -37 | -93 | 93 | 37 | 9 | 1 |
| 512 * l(n)| 1 | 8  | 28 | 56  | 326 | 56 | 28 | 8 | 1 |

Producing the Output Image

Figure 14:
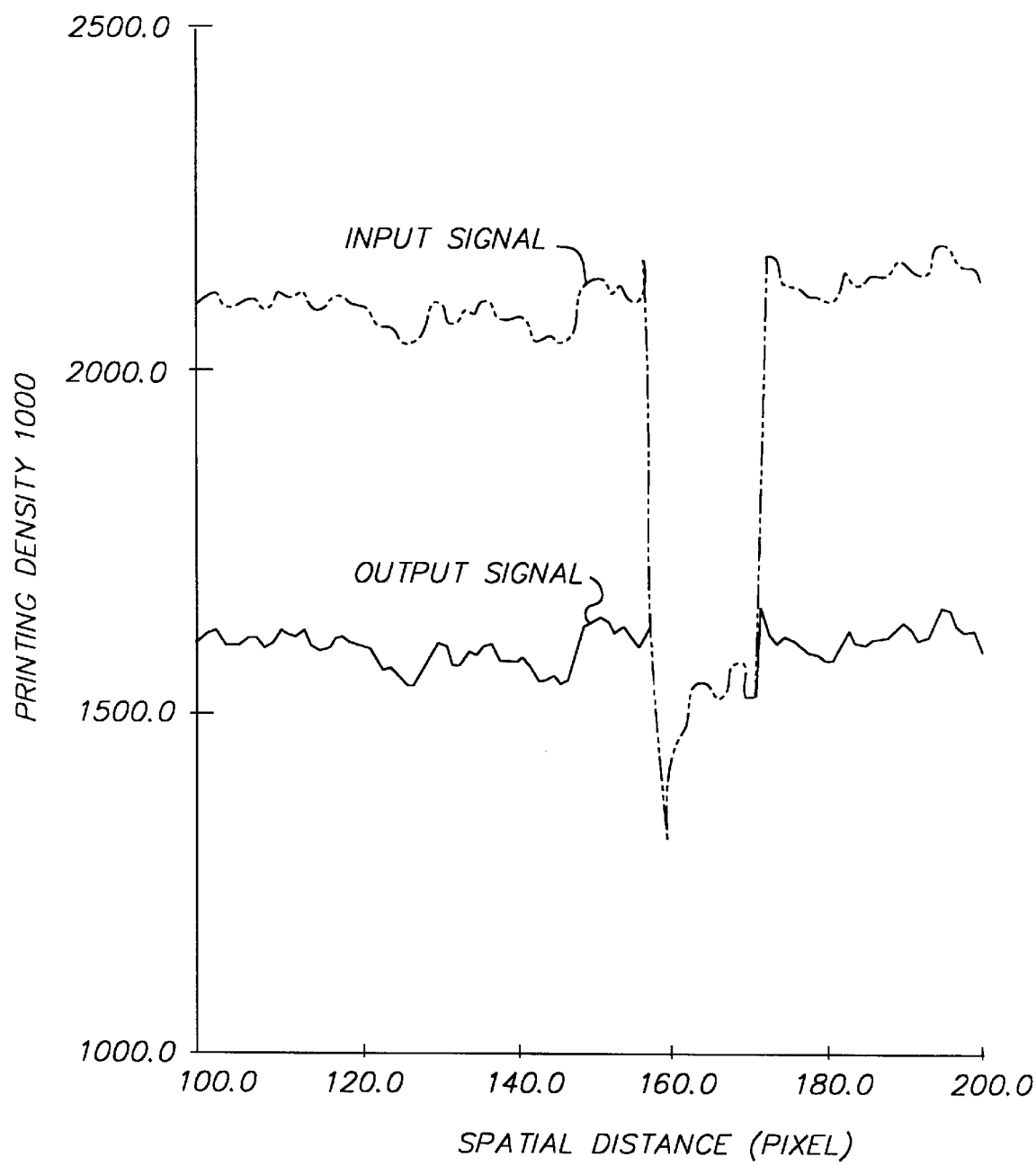
FIG. 14 shows a comparison of the input signal profile of a line through the input image I and the output signal profile of the same line through the output image $I_{out}$.
Figure 2:
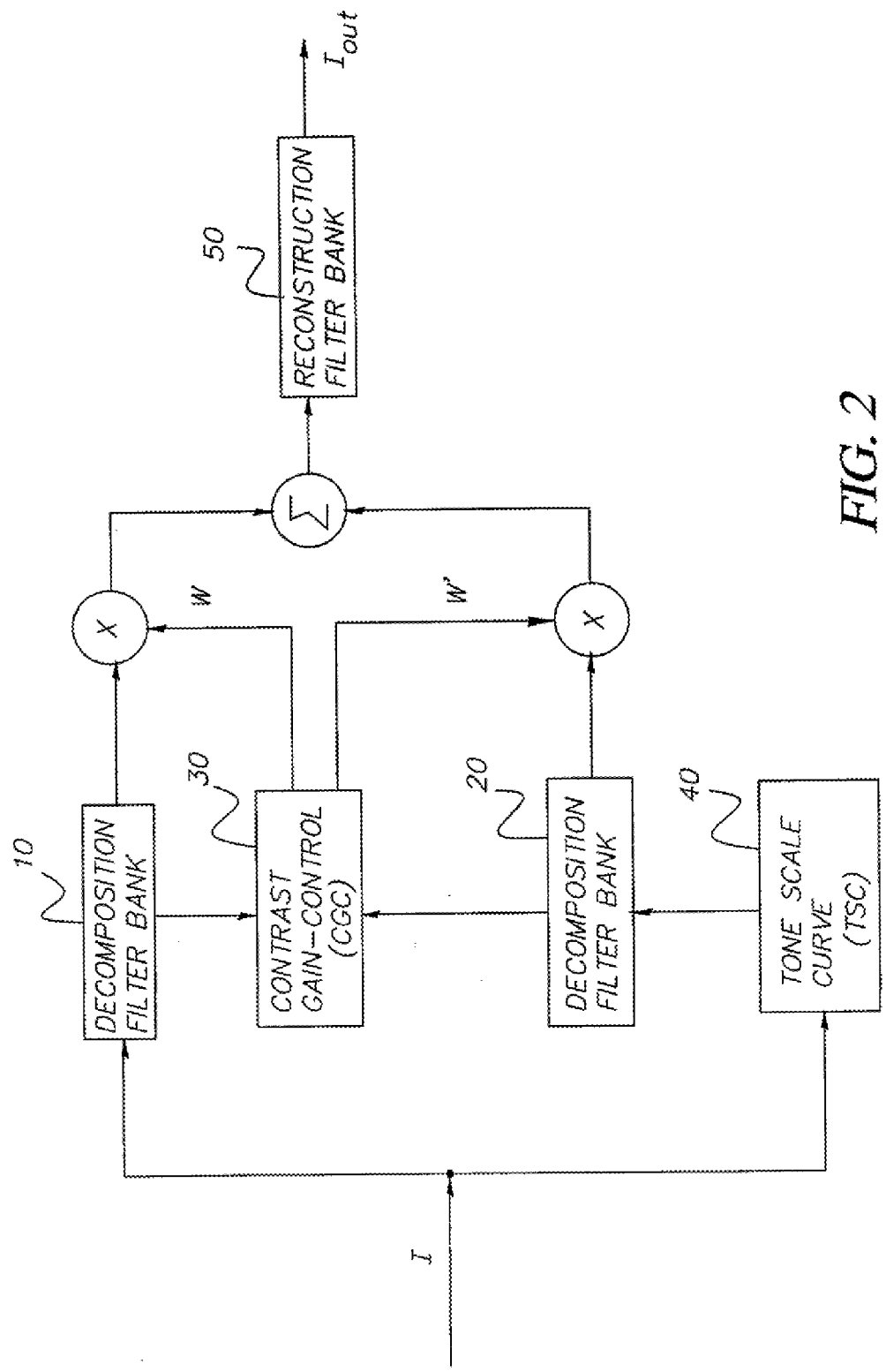
Figure 4:
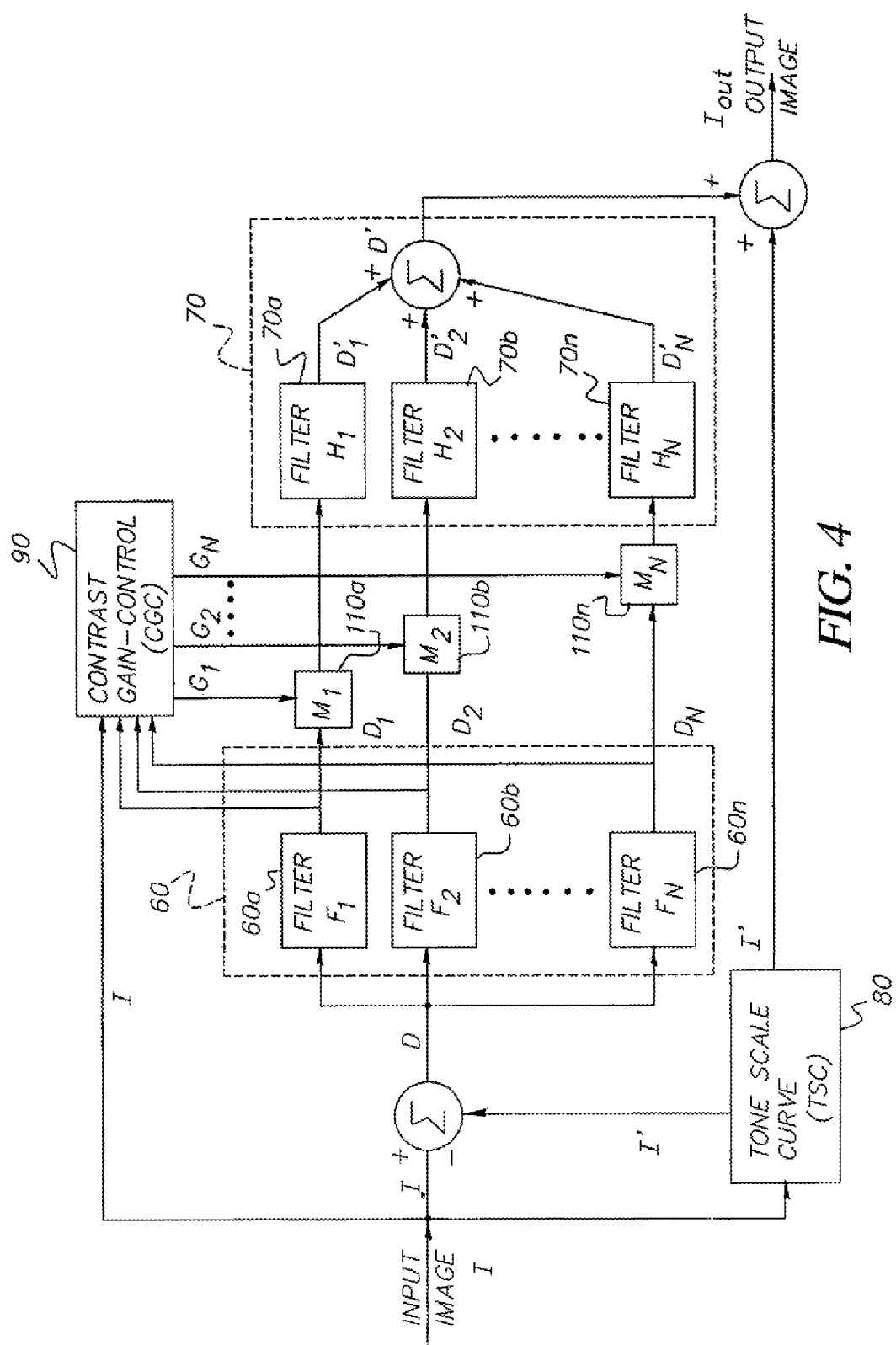

The output signal D' from the filter banks contains all the fine details that are in the original input image I, but are missing in the tone-scaled and dynamic-range-compressed image I'. One of the most important features of this invention is that the high contrast illumination edges are suppressed by the contrast gain-control and therefore they are not present in D', the output of the filter banks module. By adding D' back to I', the algorithm produces an output image $I_{out}$ that is free from the banding artifacts in the dynamic range compressed image. FIG. 14 shows a comparison of the input signal profile of a line through the input image I and the output signal profile of the same line through the output image $I_{out}$. The dynamic range of the input image signal is greatly reduced and yet, there is no banding artifact at the very high contrast edges (around pixel locations 160 and 170). The low-contrast image details at other locations are well preserved.

What is claimed is:

1. A method of reducing the dynamic range of an input image for effectively rendering the input image on an output display medium, the method comprising the steps of:
   (a) extracting detail signals and coarse signals from the input image;
   (b) generating contrast gain-control signals from the input image by detecting coarse scale edges;
   (c) modifying the detail signals according to the contrast gain signals; and,
   (d) adding the modified detail signals to the coarse signals to obtain an output image.

2. The method as in claim 1, wherein step (b) comprises the steps of:
   (b1) processing the input image through a low-pass filter to obtain a blurred version of the input image;
   (b2) computing gradient amplitudes of the blurred image; and,
   (b3) using the gradient amplitude as an index into a look-up table to generate the contrast gain control signal.

3. The method as in claim 2, wherein the step of extracting the detail signals includes processing the input image through a plurality of band pass and high pass filters.

4. The method as in claim 1 further comprising modifying the coarse signals with a tone scale curve after step (c).

5. A method of reducing the dynamic range of an input image I so that it can be rendered effectively on an output display medium, comprising the steps of:
   (a) constructing a tone scale curve T from the input image I;
   (b) mapping the input image I through the tone scale curve T to produce a tone-scaled image I'=T(I);
   (c) constructing a mask image of weighting factors, W, from the input image such that W varies from 1.0 in regions where edge contrast is low to 0.0 in regions where edge contrast is high; and,
   (d) producing an output image, $I_{out}$=W H(I)+(1-W) H(I')+L(I'), where H(I) is the high-pass filtered input image, H(I') is the high-pass filtered tone-scaled image, and L(I') is the low-pass filtered version of the tone-scaled image I'.

6. The method according to claim 5, wherein the step (a) of constructing a tone scale curve comprises the step of:
   (a1) computing the histogram from the input image;
   (a2) finding the low end, the median point, and the high end of the input values from the said histogram at some fixed percentiles;
   (a3) mapping the low end point to a black level of the output medium with a higher than normal local slope;
   (a4) mapping the median point to a medium gray level of the output medium with a normal contrast; and,
   (a5) mapping the high end point to a white level of the output medium with an adjustable contrast, depending on the shape and the range of an upper tail of the said histogram.

7. The method according to claim 5, wherein step (c) of constructing a mask image W of weighting factor comprises the steps of:
   (c1) low-pass filtering the input image;
   (c2) computing an image gradient from the low-pass filtered image; and,
   (c3) mapping the magnitude of the said image gradient through a lookup table which is calculated from a smooth monotonic function to produce the mask image W of the weighting factor.

8. A method of reducing the dynamic range of an input image I so that it can be rendered effectively on an output display medium, comprising the steps of:
   (a) constructing a tone scale curve T from the input image I;
   (b) mapping the input image I through a tone scale curve T to produce a tone-scaled image I'=T(I);
   (c) producing a difference image D=I-I' by subtracting the tone-scaled image from the input image;
   (d) producing a modified difference image, D', by processing the difference image D through a plurality of band-pass and high-pass filters; and,
   (e) adding the modified difference image D' to the tone-scaled image I' to produce a dynamic range compressed output image.

9. The method according to claim 8, wherein the step (a) of constructing a tone scale curve comprises the steps of:
   (a1) computing the histogram from the input image;
   (a2) finding the low end, the median point, and the high end of the input values from the said histogram at some fixed percentiles;
   (a3) mapping the low end point to the black level of the output medium with a higher than normal local slope;

(a4) mapping the median point to the medium gray level of the output medium with a normal contrast; and, (a5) mapping the high end point to the white level of the output medium with an adjustable contrast, depending on the shape and the range of the upper tail of the said histogram.

10. The method according to claim 8, wherein the band-pass and high-pass filters used in step (d) are edge detectors at various spatial scales.

11. A method of reducing the dynamic range of an input image I so that it can be rendered effectively on an output display medium, comprising the steps of:

(a) constructing a tone scale curve T from the input image I;

(b) mapping the input image I through the tone scale curve T to produce a tone-scaled image I'=T(I);

(c) producing a difference image D=I–I' by subtracting the tone-scaled image from the input image;

(d) generating contrast gain-control signals G from the input image;

(e) producing a modified difference image, D', by passing the difference image D through an edge-detecting filter bank where edge signals in each spatial-scale are modulated by the said contrast gain-control signals G; and, (f) adding the modified difference image D' to the tone-scaled image I' to produce a dynamic range compressed output image.

12. The method according to claim 11, wherein the step (a) of constructing a tone scale curve comprises the steps of:

(a1) computing the histogram from the input image;

(a2) finding the low end, the median point, and the high end of the input values from the said histogram at some fixed percentiles;

(a3) mapping the low end point to the black level of the output medium with a higher than normal local slope;

(a4) mapping the median point to the medium gray level of the output medium with a normal contrast; and, (a5) mapping the high end point to the white level of the output medium with an adjustable contrast, depending on the shape and the range of the upper tail of the said histogram.

13. The method according to claim 11, wherein step (d) of constructing contrast gain control signals G comprises the steps of:

(d1) low-pass filtering the input image;

(d2) computing the image gradient from the low-pass filtered image; and, (d3) mapping the magnitude of the said image gradient through a lookup table which is calculated from a smooth monotonic function to produce the contrast gain-control signals G.

14. A method of generating a tone-scale curve from an image for dynamic range compression, comprising the steps of:

(a) computing a histogram from the input image;

(b) finding a low end, a median point, and a high end of the input values from the histogram at some fixed percentiles;

(c) mapping the low end point to a black level of the output medium with a higher than normal local slope;

(d) mapping the median point to a medium gray level of the output medium with a normal contrast; and, (e) mapping the high end point to a white level of the output medium with an adjustable contrast, depending on the shape and the range of an upper tail of the histogram.

15. A method of image contrast enhancement using contrast gain-control signals for suppressing banding artifacts, comprising the steps of:

(a) decomposing an input image into edge gradients of several spatial scales;

(b) generating contrast gain-control signals G from the original input image;

(c) enhancing each edge gradient signal by modifying its amplitude according to separately generated contrast gain-control signals G in step (b); and, (d) reconstructing an enhanced output image from the modified edge signals of step (c).

16. The method according to claim 15, wherein the step (b) of generating contrast gain-control signals G comprises the steps of:

(b1) low-pass filtering the input image;

(b2) computing an image gradient from the low-pass filtered image; and, (b3) mapping the magnitude of the image gradient through a lookup table which is calculated from a smooth monotonic function to produce the contrast gain-control signals G.

* * * * *

UNITED STATES PATENT AND TRADEMARK OFFICE
CERTIFICATE OF CORRECTION

| | | |
|---|---|---|
| PATENT NO. | : 6,285,798 B1 | |
| APPLICATION NO. | : 09/210107 | |
| DATED | : September 4, 2001 | |
| INVENTOR(S) | : Hsien Lee | |

It is certified that error appears in the above-identified patent and that said Letters Patent is hereby corrected as shown below:

Delete Figs - 2 & 4 and
FIG. 2
Insert ATTACHED

FIG. 4
Insert ATTACHED

Signed and Sealed this

Twenty-eighth Day of November, 2006

JON W. DUDAS
*Director of the United States Patent and Trademark Office*